(12) United States Patent
Johnston et al.

(10) Patent No.: US 6,318,522 B1
(45) Date of Patent: Nov. 20, 2001

(54) ROTARY DAMPER WITH MAGNETIC SEALS

(75) Inventors: Gary Lee Johnston, Pleasant Hill; Michael Leslie Oliver, Xenia; Richard Edward Longhouse, Dayton; Brian Paul Heber, Delaware; William Charles Kruckemeyer, Beavercreek, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/326,389

(22) Filed: Jun. 4, 1999

(51) Int. Cl.[7] ......................................................... F16F 9/53
(52) U.S. Cl. ..................... 188/267.2; 188/290; 188/276; 192/208
(58) Field of Search ................................ 188/267.2, 276, 188/288, 290, 293, 378, 306; 192/21.5, 55.4, 84.3, 208; 482/5, 900

(56) References Cited

U.S. PATENT DOCUMENTS

| | | | |
|---|---|---|---|
| 3,613,842 | * 10/1971 | Buciak | 188/306 |
| 4,716,996 | * 1/1988 | Hummel | 188/306 |
| 5,081,882 | 1/1992 | Kogure et al. | 74/574 |
| 5,305,858 | * 4/1994 | Haga et al. | 188/271 |
| 5,816,372 | 10/1998 | Carlson et al. | 188/267.2 |
| 5,845,752 | * 12/1998 | Gopalswamy et al. | 188/267.2 |
| 5,848,678 | * 12/1998 | Johnston et al. | 188/267.2 |
| 5,947,238 | * 9/1999 | Jolly et al. | 188/267.1 |
| 5,988,336 | * 11/1999 | Wendt et al. | 188/267.2 |

* cited by examiner

Primary Examiner—Robert J. Oberleitner
Assistant Examiner—Mariano Sy
(74) Attorney, Agent, or Firm—Robert M. Sigler

(57) ABSTRACT

A damper for damping movement of a shaft, the damper including a housing having an inner surface defining a chamber and a rotor rotatably mounted in the chamber. The chamber is filled with magnetorheological fluid such that when the rotor is moved in the chamber the magnetorheological fluid damps the movement of the rotor. The rotor has an outer surface adjacent to and spaced apart from the inner surface. The damper further comprises shaft coupled to the rotor and an outer magnet adjacent the space between the outer surface and the inner surface for restricting the flow of the magnetorheological fluid in the space between the outer surface and the inner surface.

2 Claims, 4 Drawing Sheets

ROTARY DAMPER WITH MAGNETIC SEALS

TECHNICAL FIELD

The present invention relates to shock absorbers, and more particularly, to rotary dampers sufficiently rugged to be used in vehicle shock absorbing systems.

BACKGROUND OF THE INVENTION

Shock absorbers are used with automobiles and other vehicles to absorb shock forces sustained by the vehicle wheels. One type of shock absorber used in such applications is the conventional, linear-style shock absorber. Linear-style shock absorbers typically include a pair of telescoping cylindrical sleeves oriented generally vertically in the vehicle. A piston associated with one of the sleeves travels in a fluid-filled cylinder associated with the other sleeve. One end of the shock absorber is coupled to a wheel support structure and the other end is fixed to the body or frame of the vehicle. When a shock force displaces one of the vehicle wheels, the force drives the piston along the cylinder, thereby driving fluid through an orifice in the piston. The piston resists such motion with a force proportional to the shock force. Such linear shock absorbers must be oriented substantially vertically within the vehicle body and must be positioned adjacent the associated vehicle wheel.

Rotary shock absorbers, also known as rotary dampers, have been developed to replace linear-style shock absorbers. Rotary shock absorbers operate by converting shock forces into rotary motion, and then damping the rotary motion. Rotary shock absorbers have several advantages over conventional linear-style shock absorbers. For example, rotary shock absorbers do not need to be mounted adjacent to the vehicle wheel, as do linear-type shock absorbers, nor do they need to be mounted in any particular orientation. Rotary dampers may be oriented generally horizontally, and thereby extend underneath the body of the vehicle.

Rotary dampers typically include a shaft which transmits shock forces from the wheel to one or more rotors encased in a cylindrical housing. Each rotor preferably includes two or more lobes and the housing includes ported guide plates between the lobes. The housing contains fluid in the gap between the lobes and guide plates. When the rotor is rotated, the fluid is compressed by the rotor against the guide plates and is forced through the ports in the guide plates. Typically, there arc seals between the rotor and the housing and the rotor and the guide plates which restrict the flow of damping fluid around the rotor, and such seals require close tolerances to be effective. However, repeated oscillations of the rotor wear the mechanical seals and eventually require replacement of the damper. Accordingly, there is a need for a rotary damper which has effective, durable, and inexpensive flow-restricting seals between the rotor and the housing and guide plates.

SUMMARY OF THE INVENTION

The present invention is a rotary damper, suitable for use in a vehicle shock absorbing system, which provides an effective, durable and inexpensive flow-restricting seal between the rotor and the housing, and between the rotor and the guide plates. The damper uses magnetorheological fluid to damp the motion of the rotor, and permanent magnets to restrict the flow of fluid between the rotor and the housing and between the rotor and the guide plates. Because the magnetorheological fluid increases in viscosity in the presence of a magnetic field, the magnets effectively act as seals to minimize the flow of magnetorheological fluid between the rotor and the guide plates and the housing.

In a preferred embodiment of the invention, the damper includes a housing having an inner surface defining a chamber, and a rotor mounted in the chamber for oscillatory movement. The rotor has a pair of opposing lobes positioned between ported guide plates fixed to the housing. The space in the chamber between the lobes and the guide plates is filled with magnetorheological fluid. The rotor is attached to a shaft which, in turn, is connected to the wheel suspension assembly, and the housing is mounted on the vehicle frame. Oscillatory movement of the rotor in the chamber in response to the pivoting movement of the shaft forces the magnetorheological fluid through orifices in the guide plates and damps the movement of the rotor. Each lobe of the rotor includes a magnet positioned at the interface with the inner surface of the housing, which increases the viscosity of the fluid and hence reduces the ability of the magnetorheological fluid to flow between the lobe and the housing inner surface. The guide plates each include a permanent magnet adjacent to the rotor to provide a seal at that interface.

Accordingly, it is an object of the present invention to provide a rotary damper which is sufficiently rugged and durable to be used in motor vehicle applications; a rotary damper which utilizes magnetorheological fluid properties to effect a restrictive seal; and a rotary damper which is easy to fabricate and install.

Other objects and advantages of the present invention will be apparent from the following description, the accompanying drawings and the appended claims.

DESCRIPTION OF THE PREFERRED EMBODIMENT

Figure 1:
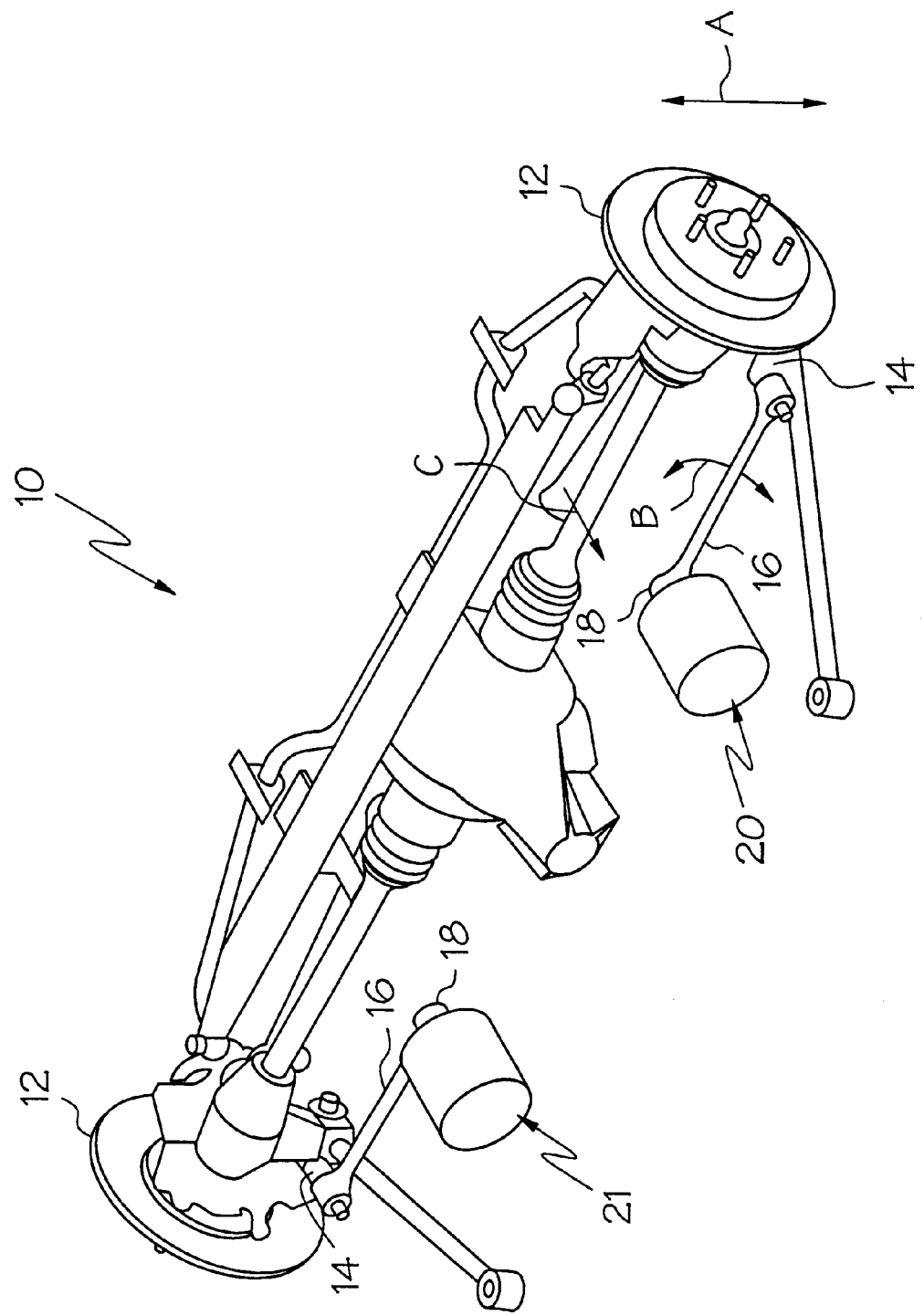
FIG. 1 is a perspective view of a suspension system of a vehicle incorporating preferred embodiments of the rotary damper of the present invention.

As shown in FIG. 1, the rotary damper of the present invention may be used in a suspension system for a vehicle, generally designated 10. However, it is within the scope of the present invention to employ the rotary damper in other environments, such as exercise equipment. The suspension system 10 includes a pair of disk and hub assemblies 12 upon which wheels (not shown) are mounted. A knuckle 14 extends generally outwardly from each disk and hub assembly 12, and a shaft 16 is pivotally attached to the knuckle. When shock forces are applied to a wheel, the wheel and associated disk and hub assembly 12 are vertically displaced, as indicated by the arrow A. The displacement causes the shaft 16 to pivot about end 18 as shown by arrow B. The shafts 16 are coupled to rotary dampers 20, 21 that damp the rotation of the shaft 16 and vertical movement of the disk and hub assemblies 12.

Figure 2:
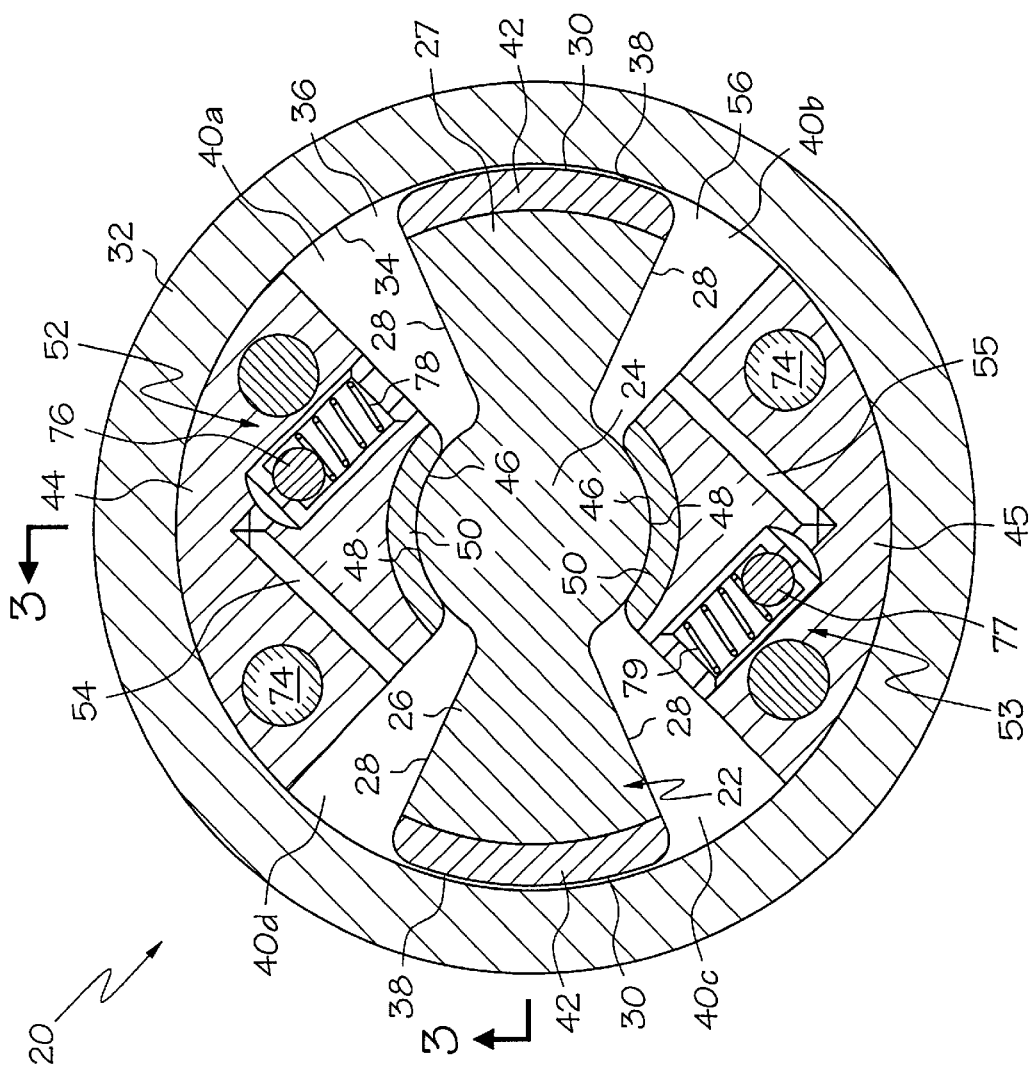
FIG. 2 is a side elevation in section of a damper of the suspension system of FIG. 1.
Figure 4:
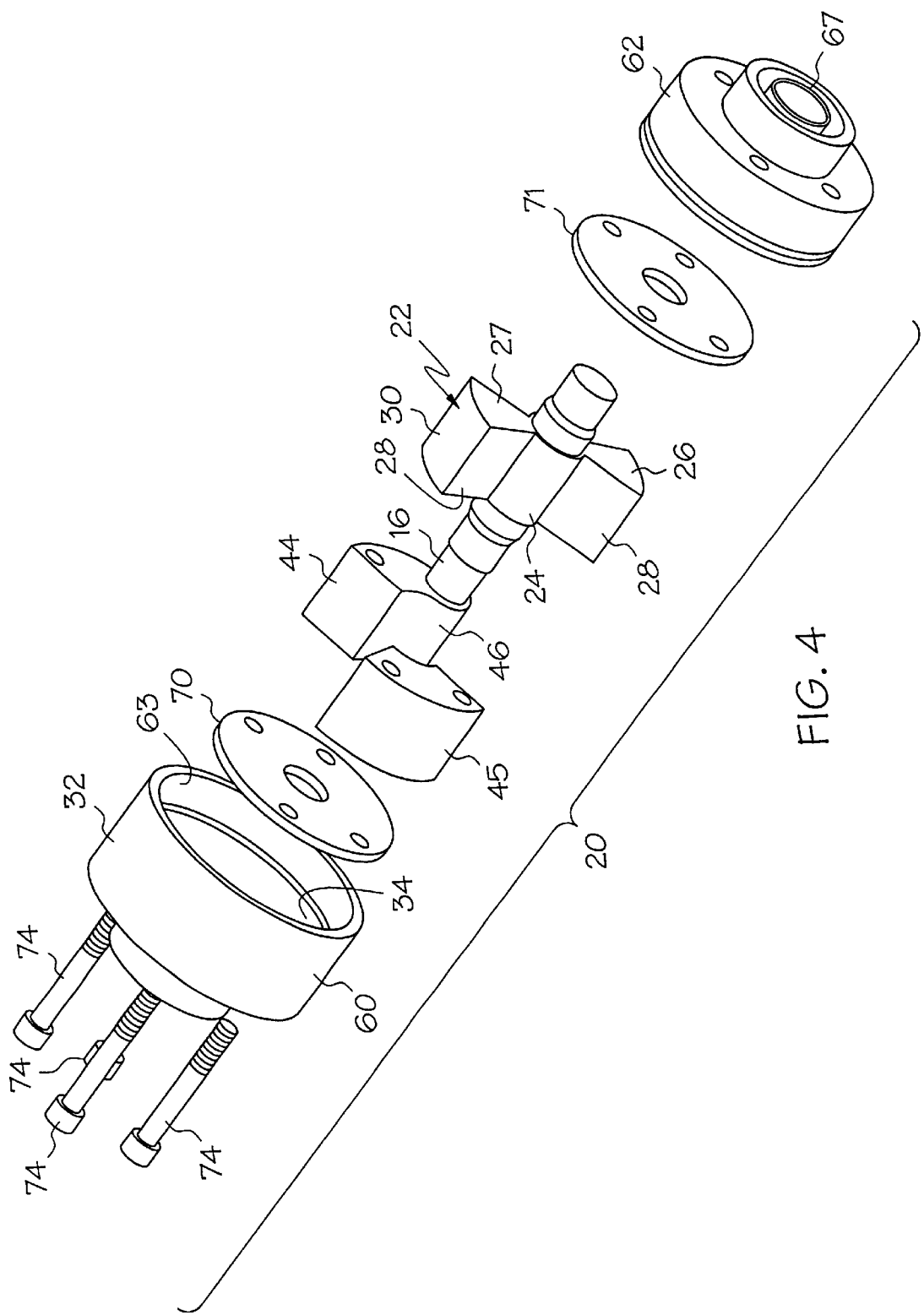
FIG. 4 is an exploded, perspective view of the damper of FIG. 2.

The dampers 20, 21 are of identical construction, and accordingly, only damper 20 will be described, it being understood that such description applies to damper 21 as well. As shown in FIGS. 2 and 4, the damper 20 includes a rotor 22 having a hub 24 and a pair of opposed, radially outwardly extending lobes 26, 27. Each lobe 26, 27 includes a pair of side faces 28 and an outer, arcuate surface 30. While the rotor 22 of the damper 20 utilizes two opposed lobes 26, 27 it is within the scope of the present invention to provide other numbers of lobes, including a single lobe or more than two lobes. The rotor 22 is shaped to be received in a housing 32. The housing 32 includes an inner surface 34 defining a chamber 36. As shown in FIG. 4, the housing 32 is preferably cylindrical forming a cylindrical internal chamber 36. The housing 32 is preferably made from a ferromagnetic material, such as mild steel.

Figure 3:
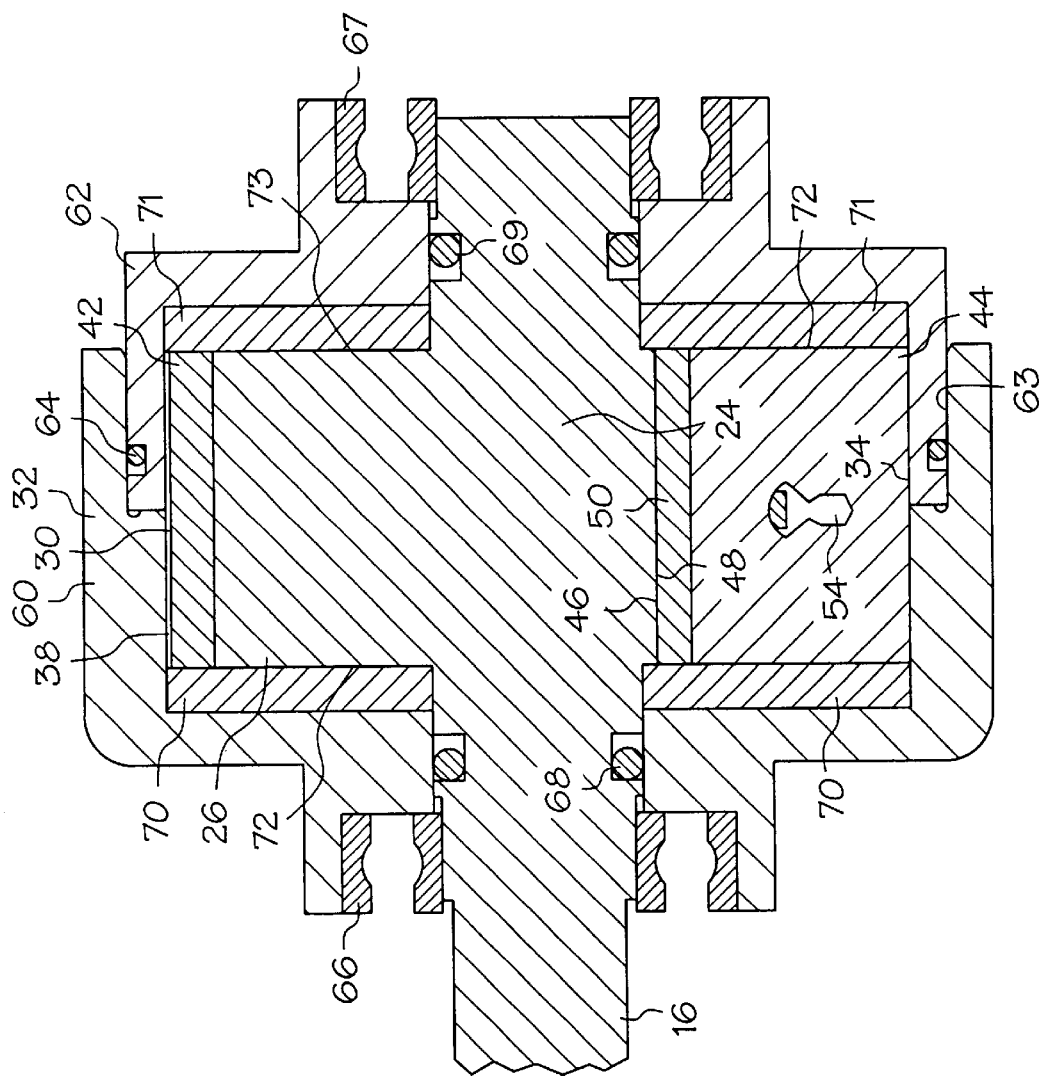
FIG. 3 is a section taken at line 3—3 of FIG. 2.

As best shown in FIG. 2, the lobes 26, 27 of the rotor 22 are shaped to form a small outer gap 38 with the housing 32. In this manner, the rotor 22 divides the chamber 36 into a plurality of discreet volumes or cavities 40a, 40b, 40c and 40d inside the chamber 36. As shown in FIGS. 2 and 3, the outer periphery of each lobe 26, 27 includes a magnet 42 preferably forming the outer surface of the lobes 26, 27.

As best shown in FIGS. 2 and 4, the damper 20 includes a pair of opposing, wedge-shaped guide plates 44, 45 that extend generally radially inwardly toward the hub 24. The guide plates 44, 45 preferably are made from a non-magnetic material, such as aluminum. The hub 24 of the rotor 22 is positioned between the guide plates 44, 45 such that the hub 24 is adjacent to the inner surfaces 46 of each guide plate 44, 45. Each guide plate inner surface 46 is arcuate in shape and is shaped to form a small inner gap 48 with the hub. Each of the guide plates 44, 45 includes an inner magnet 50 adjacent to the rotor hub 24 and forming the inner surface 46. As shown in FIG. 2, each guide plate 44, 45 includes a check valve 52, 53 that is in fluid communication with the chamber 36 via conduits 54, 55. Conduit 54 extends through guide plate 44 to connect adjacent volumes 40d, 40a and conduit 55 extends through guide plate 45 to connect adjacent volumes 40b, 40c. The operation of the check valves 52, 53 will be discussed in greater detail below.

The chamber 36 is preferably filled with magnetorheological fluid 56, which is a fine iron powder or fine iron alloy particles suspended in a liquid base, such as mineral oil or silicone. The suspension of ferromagnetic particles in a fluid medium is known to affect the rheology of the medium in which the particles are suspended, particularly when subjected to a magnetic flux. The flow characteristics of the fluid 56, such as viscosity, can change by several orders of magnitude when the fluid 56 is subjected to a magnetic field of sufficient strength. The magnetorheological fluid 56 preferably has one or more additives that prevent the iron from separating out from the liquid base.

As shown in FIG. 1, the dampers 20, 21 are mounted to the frame or body (not shown) of an associated vehicle such that when the shaft 16 is rotated due to shock forces applied to the disk and hub assembly 12, the rotary forces are transmitted to the hub 24. The shock forces cause the hub 24 to rotate clockwise or counterclockwise in the chamber 36, depending upon the direction of travel of the wheel and hub assembly 12 and the orientation of the damper 20, 21. In the damper 20 shown in FIG. 2, an upward displacement of the disk and hub assembly 12 preferably causes the rotor 22 to rotate clockwise. Thus, FIG. 2 is a cross section of the damper 20 looking along line C of FIG. 1. As the rotor 22 rotates within the chamber 36 the motion of lobe 26 toward guide plate 44 decreases the volume 40d, and the motion of the lobe 27 toward the guide plate 45 decrease the volume 40b. As the chambers 40b, 40d decrease in volume and thus increase in pressure, the fluid 56 seeks to flow into the chambers having lower pressure (40a, 40c). Thus, magnetorheological fluid 56 flows through orifices 54, 55 and into volumes 40a, 40c. Fluid flowing through the orifices 54, 55 impinges upon the balls 76, 77 and compresses the springs 78, 79 thereby and opening the valves 52, 53.

As the rotor 22 rotates, fluid also flows through the inner gap 48 and the outer gap 38 in a controlled manner. Thus, flow may fluid from the chamber 40d to the chamber 40c via the outer gap 38 located adjacent lobe 26, and fluid 56 may flow from the chamber 40d to the chamber 40a via the inner gap 48 located adjacent guide plate 44. Similarly, fluid may flow from the chamber 40b to the chamber 40a via the outer gap 38 located adjacent the lobe 27, and fluid may flow from the chamber 40b to the chamber 40c via the inner gap 48 located adjacent the guide plate 45. The restricted flow of fluid through orifices 54, 55 and the inner gaps 48 and outer gaps 38 resists the rotation of the rotor 22, thereby damping the motion of the shaft 16. The flow of magnetorheological fluid through the outer gap 38 and inner gap 48 is preferably restricted to provide greater control over the damping.

The outer magnets 42 restrict the flow of magnetorheological fluid 56 between the outer surface 30 of the rotor 22 and the inner surface 34 of the housing 32. The viscosity of the fluid 56 increases in the presence of a magnetic field, and the increased viscosity restricts the flow of fluid through the outer gaps 38. It is believed that the iron particles in the magnetorheological fluid 56 align in the presence of a magnetic field, which increases the viscosity of the fluid 56. The increased viscosity adds a shear force that any fluid 56 must overcome in order to flow through the outer gap 38. In this manner, a controllable, restrictive seal is effectively formed between the rotor 22 and the housing 32 at the outer gaps 38. Thus, the outer magnets 42 act to restrict the flow of the magnetorheological fluid 56 through the outer gaps 38 in a radial direction (i.e. a direction generally opposite the movement of the rotor 22) by restricting the flow of fluid 56 across the outer surface 30 of the rotor 22. Similarly, the inner magnets 50 help to provide a controllable, restrictive seal between the hub 24 of the rotor 22 and the inner surface 46 of the guide plates 44, 45.

In this manner, a relatively simple and durable restrictive-flow seal is provided by the magnets 42, 50. Of course, it should be understood that the outer magnets 42 may be positioned at various locations in the damper 20, so long as they are close enough to the outer gap 38 to restrict the flow in the outer gap 38 in the desired manner. Thus the outer magnets 42 may be located on the housing 32 instead of the rotor 22. Similarly, the inner magnets 50 may be located on the hub 24 instead of on the guide plates 44, 45. In the illustrated embodiment, the housing 32 is generally cylindrical such that the inner surface 34 of the housing 32, the outer surface 30 of the rotor 22, the outer surface of the hub 24, and the inner surface 46 of the guide plates 44, 45 are shaped generally cylindrically shaped; that is, they are shaped as a cylinder or as a segment of a cylinder, and thus are circular or arcuate in side view. However, the use of magnets in the presence of magnetorheological fluid to form seals may be used in a variety of dampers without departing from the scope of the present invention. Thus, a permanent magnet may be used to restrict the flow of magnetorheological fluid in non-rotary dampers such as linear motion dampers.

The counterclockwise movement of the rotor 22 in the damper 20 is damped in a similar manner to clockwise rotation of the rotor 22 described above. When shaft 16 causes the rotor 22 of FIG. 2 to rotate counterclockwise, fluid 56 is forced from the chamber 40a to the chambers 40b, 40d via the inner gap 48 and outer gap 38, and fluid 56 is forced from the chamber 40c to the chambers 40b, 40d. However, the check valves 52, 53 block fluid from flowing through the conduits 54, 55. Therefore the flow of fluid 56 within the housing 32 when the rotor is moved counterclockwise is more restricted than the flow of fluid 56 within the housing when the rotor is moved clockwise. The actuation of the check valves 52, 53 when the rotor 22 is moved in the clockwise direction provides additional fluid flow from a high pressure chamber to a lower pressure chamber, which provides additional damping. It is often desirable to provide additional damping when the vehicle wheel is moved upwardly. Shock forces in the upward direction are typically stronger, thereby necessitating a greater shock absorption. The check valves 52, 53 are typically oriented such that when the rotor 22 moves in a direction that corresponds to an upwardly-directed shock force, the fluid 56 can flow through the check valves 52, 53. Correspondingly, when the rotor 22 of FIG. 2 moves counterclockwise, the check valves 52, 53 remain closed. It should be understood that any type of relief or blow-off valve or other means for providing additional fluid flow, such as deflected disk valving, may be used in place of the check valves 52, 53 in the illustrated embodiments.

In an alternate embodiment, only a single lobe 26 may be used in the damper 20. In this case, the chambers 40a, 40b may not be present and the guide plates 44, 45 may extend into the volume occupied by the chambers 40a, 40b, and lobe 27 in FIG. 2. The valves 52, 53 may also be eliminated in this embodiment. In another alternate embodiment, the damper 20 may include only a single lobe 26, and the guides plates 44, 45 and lobe 27 of FIG. 2 may be eliminated.

As shown in FIG. 3, the housing 32 includes an inner housing 62 fit into a shoulder 63 in an outer housing 60 with an O-ring 64 therebetween. The housing 32 includes a pair of bearings 66, 67 to guide the rotation of the shaft 16, and a pair of seals 68, 69 are located between the shaft 16 and housing 32 to maintain the fluid in the housing 32. The damper 20 further includes a pair of plates 70, 71, made of ferromagnetic material such as mild steel, located on either end of the chamber 36. The magnetic plates 70 are located on opposed sides of the rotor 22, and aid in sealing the chamber 36 by increasing the viscosity of the fluid in the presence of the plates. A pair of side gaps 72, 73 may be formed between the magnetic plates 70, 71, respectively, and the rotor 22 and/or guide plates 44, 45, and there may exist a relatively small amount of fluid 56 in the side gaps 72, 73. However, the fluid in the side gaps 72, 73 does not substantially contribute to the damping of the rotor 22, and fluid 56 does not generally flow in the side gap 72, 73. As shown in FIGS. 2 and 4, a set of bolts 74 extend through the outer housing 60, plate 70, guide plates 44, 45, plate 71, and the inner housing 62 to couple the various components of the damper 20 together.

Having described the invention in detail and by reference to preferred embodiments thereof, it will be apparent that modifications and variations are possible without departing from the scope of the invention.

What is claimed is:

1. A rotary damper comprising:

a housing including an inner surface defining a chamber therein;

a rotor mounted in said chamber for rotational movement within said chamber and coupled to a shaft that transmits said rotational motion to said rotor, said rotor including a hub coupled to said shaft and a lobe extending generally radially outwardly from said hub and having an outer surface adjacent to and spaced apart from said inner surface;

magnetorheological fluid located in said chamber;

an outer magnet adjacent to a space between said outer surface and said inner surface, whereby fluid flow between said inner and outer surfaces is restricted by a magnetic field generated by said magnet and said rotational movement of said rotor in said chamber is thus damped by said fluid;

a pair of guide plates located in said chamber adjacent to and spaced apart from said hub; and an inner magnet located adjacent a space between said hub and said guide plates, said inner magnet restricting the flow of magnetorheological fluid in the space between said hub and said guide plates.

2. The damper of claim 1 wherein said inner magnet includes a pair of guide plate magnets located on said guide plates.

* * * * *